(12) United States Patent
Kino et al.

(10) Patent No.: US 12,394,833 B2
(45) Date of Patent: Aug. 19, 2025

(54) TEMPERATURE ADJUSTMENT DEVICE

(71) Applicant: TOYODA GOSEI CO., LTD., Kiyosu (JP)

(72) Inventors: Hitoshi Kino, Kiyosu (JP); Myonghwan Jang, Nagoya (JP); Naoki Yamaguchi, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 518 days.

(21) Appl. No.: 17/941,097

(22) Filed: Sep. 9, 2022

(65) Prior Publication Data

US 2023/0085947 A1 Mar. 23, 2023

(30) Foreign Application Priority Data

Sep. 17, 2021 (JP) ................................. 2021-152006

(51) Int. Cl.
*H01M 10/653* (2014.01)
*H01M 10/6556* (2014.01)

(52) U.S. Cl.
CPC ..... *H01M 10/653* (2015.04); *H01M 10/6556* (2015.04)

(58) Field of Classification Search
CPC ........... H01M 10/653; H01M 10/6556; H01M 10/613; H01M 10/617; H01M 10/625; H01M 10/643; H01M 10/647; H01M 10/651; H01M 10/6554; H01M 10/6557; H01M 10/6563; H01M 10/6568; H01M 10/658; H01M 50/209
See application file for complete search history.

(56) References Cited

U.S. PATENT DOCUMENTS

2014/0220397 A1* 8/2014 Hirsch ................ H01M 10/613
165/185
2019/0229384 A1 7/2019 Tasiopoulos et al.

FOREIGN PATENT DOCUMENTS

JP 2019-129149 A 8/2019

* cited by examiner

*Primary Examiner* — Adam A Arciero
(74) *Attorney, Agent, or Firm* — Posz Law Group, PLC

(57) ABSTRACT

A temperature adjustment device (100 and 100*a*) includes: an insulation layer (400) provided in contact with bottom parts of the plurality of batteries (Bt); and a flow passage forming member (110) that is located on a side opposite to the plurality of batteries with the insulation layer interposed therebetween, and forms a flow passage (112) of cooling medium. The flow passage includes a plurality of cooling flow passages (f1 to f10) that face the bottom surfaces of one or more different batteries of the plurality of batteries with the insulation layer interposed therebetween, a common inflow passage (112*a*) that is connected to the plurality of cooling flow passages and in which the cooling medium is flowed, and a common exhaust passage (112*b*) which collects and exhausts the cooling medium exhausted from the plurality of cooling flow passages. A cross-sectional area of a cooling flow passage corresponding to a first battery of the plurality of batteries among cross-sectional areas of the plurality of cooling flow passages is larger than a cross-sectional area of a cooling flow passage meeting a second battery whose temperature is lower than the temperature of the first battery in a use state. The cross-sectional areas of the plurality of cooling flow passages have cross sections parallel to a face of the insulation layer in contact with the bottom surfaces.

5 Claims, 15 Drawing Sheets

TEMPERATURE ADJUSTMENT DEVICE

CROSS REFERENCE TO RELATED APPLICATIONS

This application is based upon and claims benefit of priority from Japanese Patent Application No, 2021-152006, filed on Sep. 17, 2021, the entire contents of which are incorporated herein by reference.

BACKGROUND

Field

The present disclosure relates to a temperature adjustment device which adjusts temperatures of a plurality of batteries of a battery pack.

Related Art

A battery pack is cooled for the purpose of increasing operational lives of batteries in the battery pack including a plurality of batteries. JP 2019-129149 A discloses a cooling system which cools a battery pack (battery module assembly). This cooling system cools each battery by forming an exhaust port for exhausting a gas produced in each battery at a time of an abnormal rise of temperature by two cooling plates arranged a predetermined interval apart from each other, and flowing a refrigerant or a working fluid such as glycol between the two cooling plates.

However, the cooling system of JP 2019-129149 A cools each battery equally, and therefore does not resolve a temperature difference between a plurality of batteries when the temperatures of the plurality of batteries vary. Hence, internal resistances of batteries whose temperatures are relatively high become relatively low, and therefore there is a concern that a large current unevenly flows to such a battery and accelerates deterioration of the battery. The above-described "variations of the temperatures of the plurality of batteries" occur due to reasons such as the temperature of the battery arranged at a position surrounded by the other batteries of a plurality of batteries becomes relatively high, and on the other hand, the temperature of the battery located at an end part of the battery pack becomes relatively low. For this reason, there has been room for further improvement in suppressing deterioration of batteries in a battery pack.

SUMMARY

The present disclosure has been provided to solve at least part of the above-described problem, and can be realized, as the following aspects.

One aspect of the present disclosure provides a temperature adjustment device configured to adjust temperatures of a plurality of batteries in a battery pack including the plurality of batteries arranged with axial directions aligned. This temperature adjustment device includes: an insulation layer provided in contact with bottom parts of the plurality of batteries; and a flow passage forming member configured to be located on a side opposite to the plurality of batteries with the insulation layer interposed therebetween, and forms a flow passage of a cooling medium. The flow passage includes a plurality of cooling flow passages configured to face the bottom surfaces of the plurality of batteries with at least the insulation layer interposed therebetween, and to face the bottom surfaces of one or more different batteries of the plurality of batteries with the insulation layer interposed therebetween, a common inflow passage configured to be connected to the plurality of cooling flow passages and to flow the cooling medium in the plurality of cooling flow passages, and a common exhaust passage configured to collect and exhaust the cooling medium exhausted from the plurality of cooling flow passages. A cross-sectional area of a cooling flow passage corresponding to a first battery of the plurality of batteries among cross-sectional areas of the plurality of cooling flow passages is larger than a cross-sectional area of a cooling flow passage corresponding to a second battery whose temperature is lower than the temperature of the first battery among the plurality of batteries in a use state, and the cross-sectional areas of the plurality of cooling flow passages have cross sections parallel to a face of the insulation layer in contact with the bottom surfaces.

DETAILED DESCRIPTION

A. First Embodiment

A1. Device Configuration and Detailed Configuration of Battery Pack 10

Figure 1:
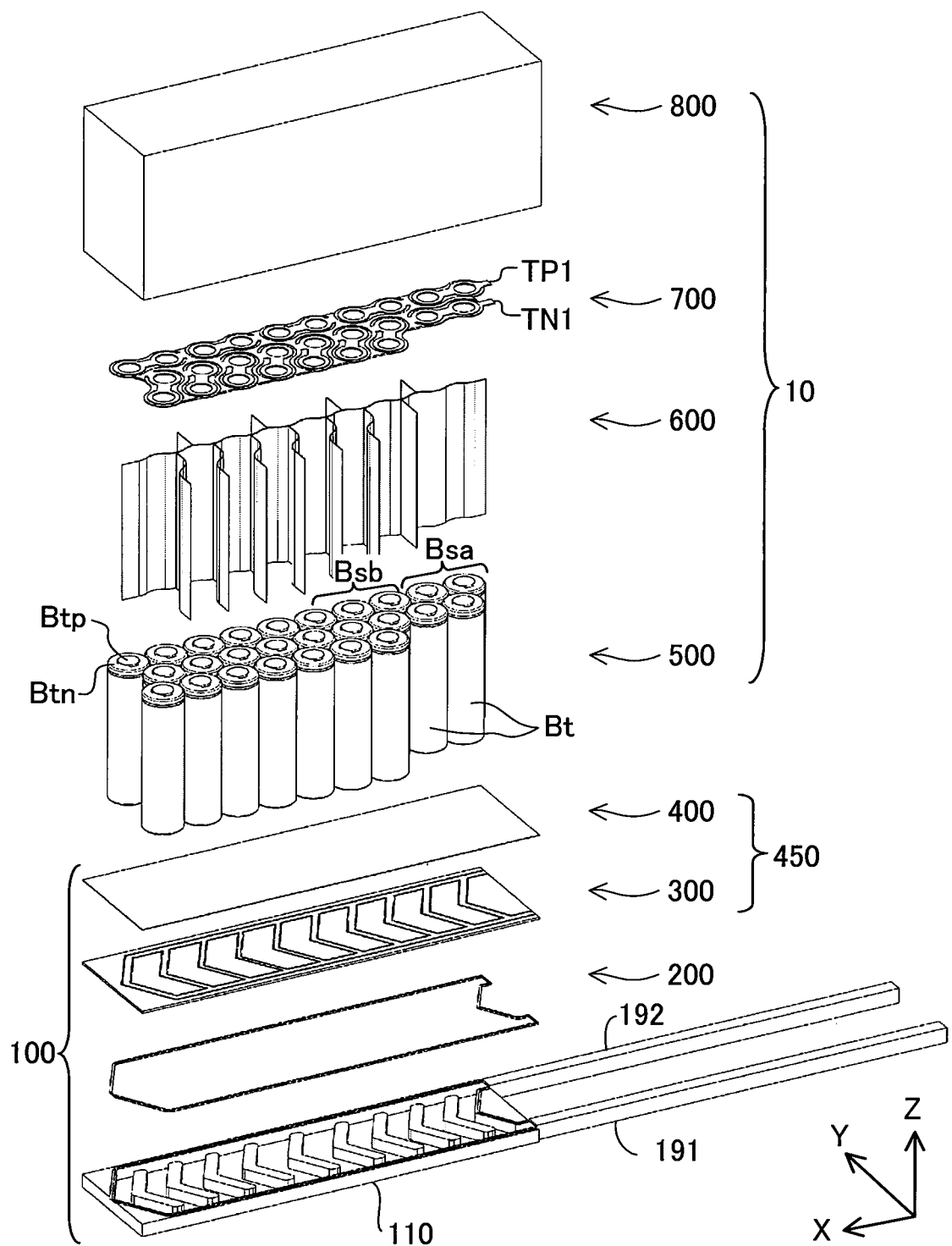
FIG. 1 is an exploded perspective view illustrating a disassembled temperature adjustment device according to one embodiment of the present disclosure, and a battery pack which is a temperature adjustment target of the temperature adjustment device.

FIG. 1 is an exploded perspective view illustrating a disassembled temperature adjustment device 100 according to one embodiment of the present disclosure, and battery pack 10 which is a temperature adjustment target of the temperature adjustment device 100. The temperature adjustment device 100 is arranged in contact with a bottom part of the battery pack 10, and adjusts temperatures of a plurality of batteries Bt included in the battery pack 10.

The battery pack 10 includes a battery row group 500, an insulation member 600, a busbar module 700 and an upper case 800. The battery pack 10 supplies electricity to the exterior from the multiple batteries Bt connected in parallel or series by the busbar module 700.

FIG. 1 illustrates X, Y and Z axes which intersect each other. In the present embodiment, a +X direction and a −X direction are collectively referred to as an "X axis direction". Similarly, a +Y direction and a −Y direction, and a +Z direction and a −Z direction are collectively referred to as a "Y axis direction" and a "Z axis direction", respectively. The X axis direction is also referred to as a battery row direction. The Y axis direction is also referred to as a direction which intersects the battery row direction. The Z axis direction is parallel to the axis lines of the cylindrical batteries Bt, and is also referred to as a "battery axial direction".

The battery row group 500 includes the plurality of batteries Bt arranged with the axial directions aligned. As illustrated in FIG. 1, the plurality of batteries Bt is aligned in the X axis direction in the battery row group 500. In the present embodiment, the battery row group 500 is configured such that the three battery rows in the X axis direction are aligned in the Y direction. In this regard, the number of battery rows of the battery row group 500 is not limited to three rows and may be an arbitrary number as long as the function and effect of the present embodiment are not undermined. The three battery rows are aligned such that mid-sections of side surfaces of batteries of a neighboring battery row are located in a recessed part formed between side surfaces of two neighboring batteries in each battery row. Consequently, in the neighboring battery rows, positions of center points of positive electrodes Btp seen from the Z axis direction are shifted from each other in the X axis direction by a length corresponding to a radius of the battery Bt seen from the Z axis direction.

Each battery Bt has a cylindrical external shape, and the positive electrode Btp is formed at one end in the axial direction (an end part in the +Z direction). In the present embodiment, a negative electrode Btn is also formed at an outer periphery part of the one end part of the battery Bt at which the positive electrode Btp is formed. More specifically, the negative electrode is formed to continuously cover an entire end part opposite to the one end part at which the positive electrode Btp is formed, the entire side surface of the battery Bt, and the outer periphery part of the one end part. Note that the negative electrode in the side surface of the battery Bt is covered by a member such as a resin which has an insulation property. As illustrated in FIG. 1, the orientation of each battery Bt is mutually the same. In the present embodiment, the plurality of batteries Bt employ a configuration where a plurality of battery sets including the two batteries Bt connected with each other in parallel is connected in a series. Each battery set includes the two batteries Bt which are aligned in a row direction axis direction). FIG. 1 illustrates two battery sets Bsa and Bsb.

The insulation member 600 is a thin plate member which is made of an insulation material, is arranged at a boundary part between the neighboring battery sets, and functions as an insulation wall. Hence, the battery row group 500 is partitioned into each battery set by the insulation member 600. The insulation member 600 is formed by, for example, a resin or insulation paper.

Figure 2:
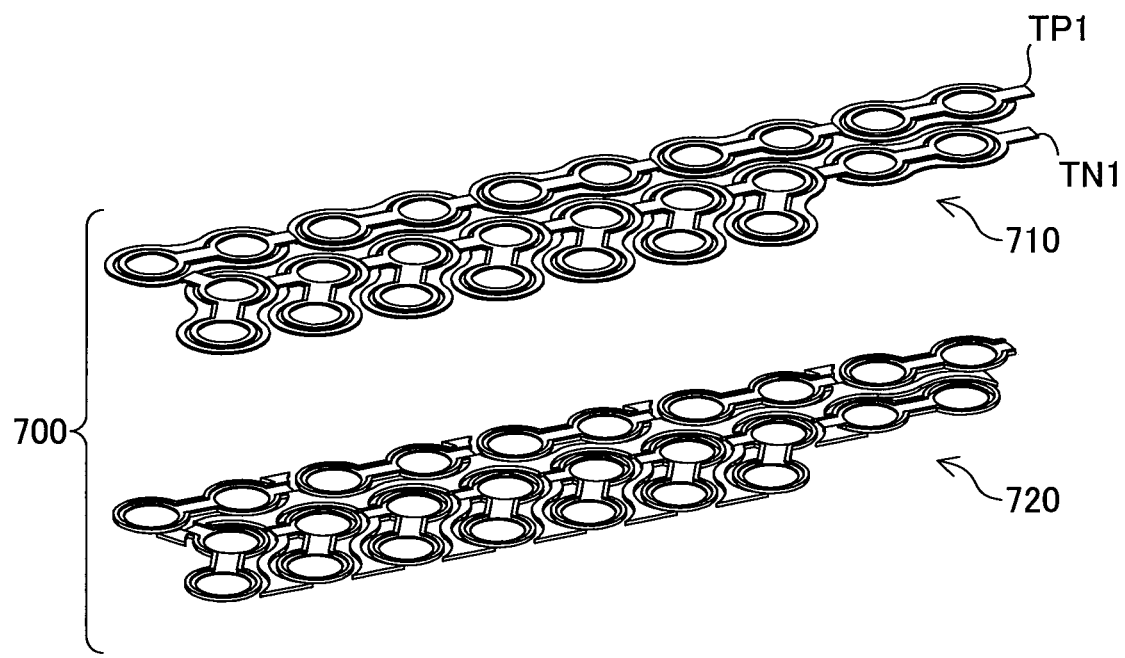
FIG. 2 is an exploded perspective view illustrating a disassembled busbar module.

FIG. 2 is an exploded perspective view illustrating the disassembled busbar module 700. As illustrated in FIG. 1, the busbar module 700 is arranged overlapping the plurality of batteries Bt in the axial direction (+Z direction). The busbar module 700 provides electrical connection (parallel connection) of the two batteries Bt in the above-described battery set, and provides electrical connection (serial connection) of the plurality of battery sets. As illustrated in FIG. 2, the busbar module 700 includes a busbar 710 and an insulation body 720. The busbar 710 is formed by a metal thin plate. The busbar module 700 is manufactured by laying the busbar 710 in the insulation body 720 made of a resin material by insert molding, post-adhesion, post welding or claw fitting. The insulation body 720 may be formed by, for example, polybutylene terephthalate (PBT) or a PBT-based polyester elastomer. In this regard, FIG. 2 illustrates the busbar 710 on an upper side of the insulation body 720 for the sake of convenience. However, when, for example, the busbar module 700 is formed by insert molding, a positional relationship between upper and lower sides in the axial direction of the busbar 710 and the insulation body 720 may also differ depending on a position of an area of the busbar module 700. As illustrated in FIGS. 1 and 2, the busbar module 700 includes a total positive electrode TP1 and a total negative electrode TN1. The total positive electrode TR1 is electrically connected with the positive electrode Btp of each battery Bt. Similarly, the total negative electrode TN1 is electrically connected with the negative electrode Bnp of each battery Bt. The total positive electrode TP1 and the total negative electrode TN1 function as terminals for extracting an electrical output of the battery pack 10.

The upper case 800 illustrated in FIG. 1 covers the battery row group 500 with which the insulation member 600 and the busbar module 700 are assembled. The upper case 800 covers the battery row group 500 and is fixed by a bolt to an unillustrated attachment plate arranged in the −Z direction of the temperature adjustment device 100. Consequently, the battery pack 10 and the temperature adjustment device 100 are integrated. The upper case 800 and the unillustrated attachment plate are each formed by a resin.

A2. Detailed Configuration of Temperature Adjustment Device 100:

The temperature adjustment device 100 adjusts the temperature of a battery row group 500 when a cooling medium flows inside the temperature adjustment device 100. As illustrated in FIG. 1, the temperature adjustment device 100 includes a flow passage forming member 110, a sealing member 200, a heater-equipped heat transfer layer 300, and an insulation layer 400. The cooling medium flowing in the temperature adjustment device 100 may be, for example, pure water, a coolant used for a vehicle, and a gas such as air or a nitrogen gas.

Figure 3:
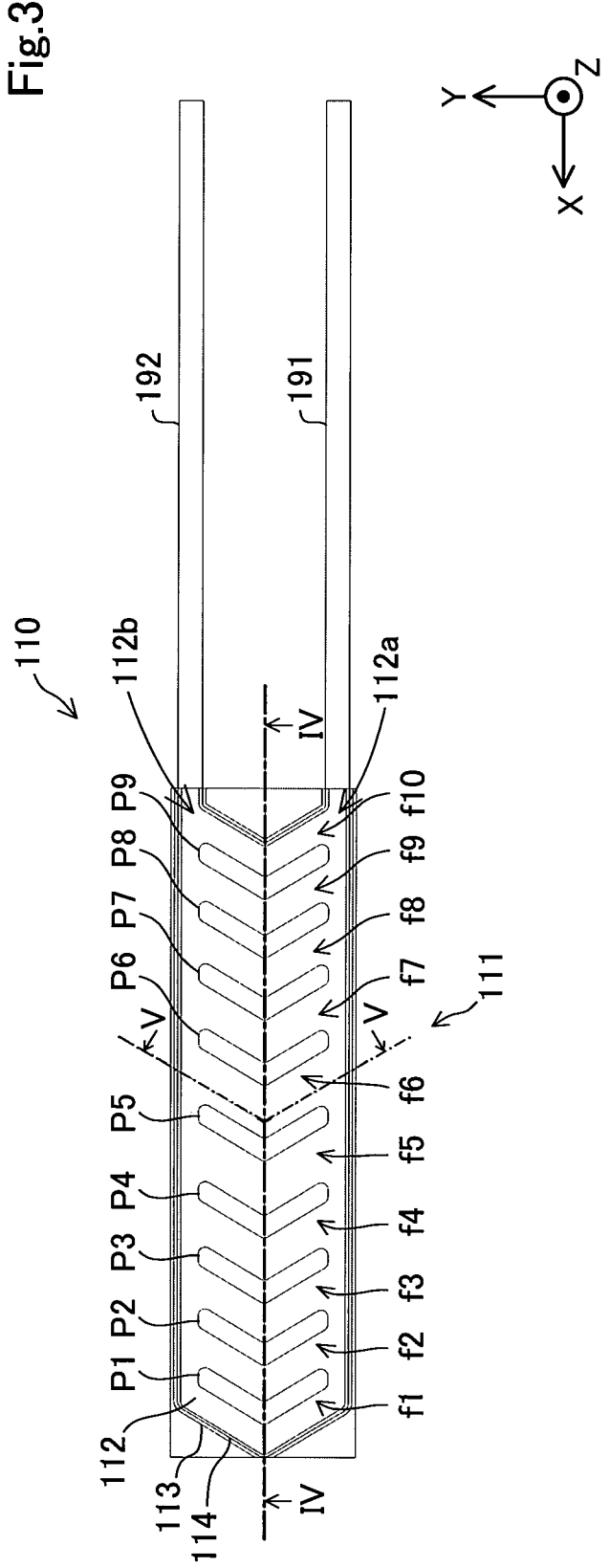
FIG. 3 is a plan view illustrating a detailed configuration of a flow passage forming member.
Figure 4:
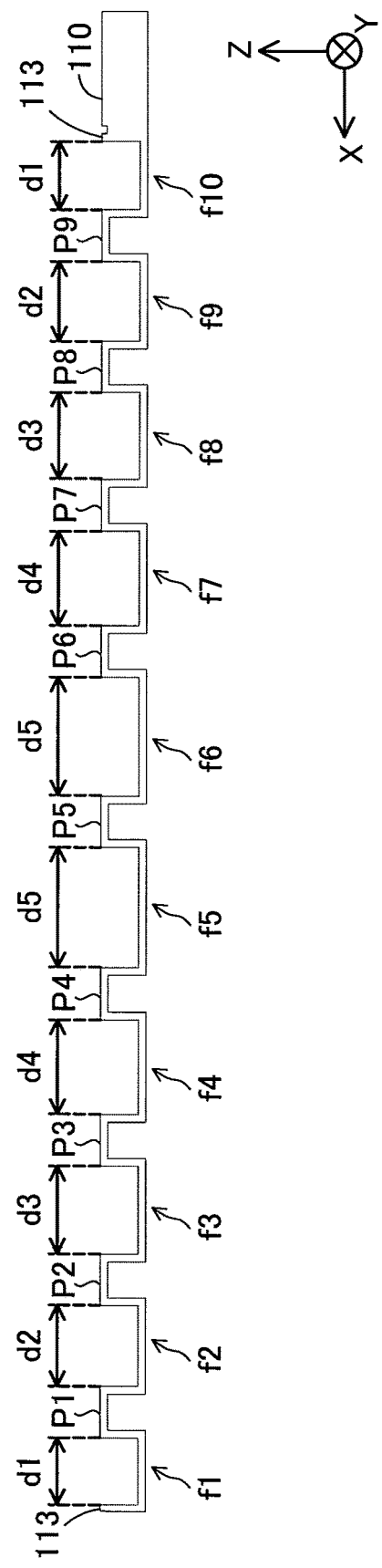
FIG. 4 is a cross-sectional view illustrating a cross section of the flow passage forming member along an IV-IV cross-section line illustrated in FIG. 3.
Figure 5:
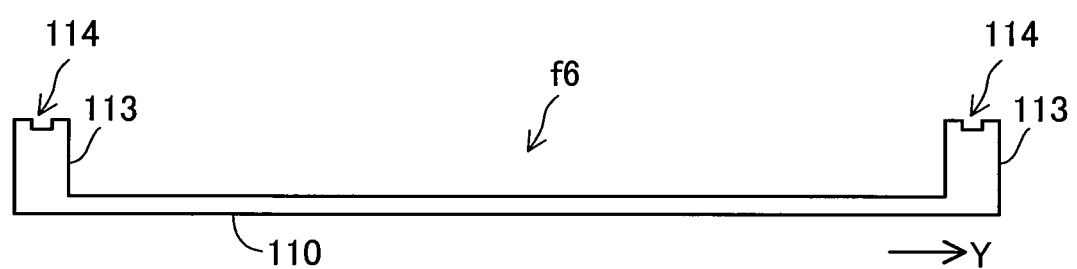
FIG. 5 is a cross-sectional view of the flow passage forming member.

FIG. 3 is a plan view illustrating a detailed configuration of the flow passage forming member 110. FIGS. 4 and 5 are cross-sectional views of the flow passage forming member 110. FIG. 4 illustrates a cross section of the flow passage forming member 110 along an IV-IV cross-sectional line illustrated in FIG. 3, and FIG. 5 illustrates a cross section of the flow passage forming member 110 along a V-V cross-sectional line illustrated in FIG. 3.

As illustrated in FIG. 3, the flow passage forming member 110 includes a main body part 111, an inflow part 191, and an outflow part 192. The main body part 111 is formed by a substantially rectangular plate member which is provided with multiple ribs at the center part.

An outer rim wall part 113 and nine partition parts P1 to P9 are formed on the main body part 111. The outer rim wall part 113 protrudes in a thickness direction (Z axis direction), and forms a flow passage 112 of a cooling medium inside. As illustrated in FIG. 5, a seal groove 114 which is dented in the −Z direction is formed on a +Z direction end surface of the outer rim wall part 113. The seal groove 114 houses the sealing member 200. As illustrated in FIG. 3, the nine partition parts P1 to P9 have shapes which each extend in the Y axis direction, are bent at the center in the Y axis direction, and are similar to each other. These shapes are shapes which match alignment of the bottom parts of the batteries Bt as illustrated in FIG. 1. As illustrated in FIG. 4, each of the partition parts P1 to P9 is configured as a rib which protrudes in the +Z direction. As illustrated in FIG. 3, the position in the Y axis direction at a −Y direction end part of each of the partition parts P1 to P9 is substantially equal to each other, and each is located closer to the +Y direction than an end part in the −Y direction of the outer rim wall part 113. Consequently, a common inflow passage 112a which is extended in the X axis direction is formed between each of the partition parts P1 to P9 and the end part in the −Y direction of the outer rim wall part 113. The common inflow passage 112a flows the cooling medium into 10 cooling flow passages f1 to f10 described later. Furthermore, as illustrated in FIG. 3, the position in the Y axis direction at a direction end part of each of the partition parts P1 to P9 is substantially equal to each other, and each is located closer to the −Y direction than an end part in the +Y direction of the outer rim wall part 113. Consequently, a common exhaust passage 112b which is extended in the X axis direction is formed between each of the partition parts P1 to P9 and the end part in the +Y direction of the outer rim wall part 113. The common exhaust passage 112b collects and exhausts the cooling media exhausted from the 10 cooling flow passages f1 to f10 described later to the outflow part 192. The common inflow passages 112a and the common exhaust passage 112b are linearly provided in parallel to each other.

As illustrated in FIGS. 3 and 4, the cooling flow passages f1 to f10 through which the cooling media flow are formed between the neighboring partition parts, More specifically, as illustrated in FIG. 4, the first cooling flow passage f1 is formed between the outer rim wall part 113 and the first partition part P1. Similarly, the second cooling flow passage f2 is formed between the first partition part P1 and the second partition part P2. The third cooling flow passage f3 is formed between the second partition part P2 and the third partition part P3. The fourth cooling flow passage f4 is formed between the third partition part P3 and the fourth partition part P4. The fifth cooling flow passage f5 is formed between the fourth partition part P4 and the fifth partition part P5. The sixth cooling flow passage f6 is formed between the fifth partition part P5 and the sixth partition part P6. The seventh cooling flow passage f7 is formed between the sixth partition part P6 and the seventh partition part P7. The eighth cooling flow passage f8 is formed between the seventh partition part P7 and the eighth partition part P8. The ninth cooling flow passage f9 is formed between the eighth partition part P8 and the ninth partition part P9. The 10th cooling flow passage 110 is formed between the ninth partition part P9 and the outer rim wall part 113. Each of the cooling flow passages f1 to f10 can be also referred to as a "groove part" between the neighboring partition parts.

As illustrated in FIG. 3, the width in the X axis direction of each of the partition parts P1 to P9 is fixed along the Y axis direction. Hence, the width in the X axis direction of each of the cooling flow passages f1 to f10 is each fixed along the Y axis direction. However, the width in the X axis direction is not necessarily the same between the cooling flow passages f1 to f10. As illustrated in FIG. 4, the width in the X axis direction of the first cooling flow passage f1 and the width in the X axis direction of the 10th cooling flow passage f10 are each a width d1 and equal to each other. Furthermore, the width in the X axis direction of the second cooling flow passage f2 and the width in the X axis direction of the ninth cooling flow passage f9 are each a width d2 and equal to each other. Furthermore, the width in the X axis direction of the third cooling flow passage f3 and the width in the X axis direction of the eighth cooling flow passage f8 are each a width d3 and equal to each other. Furthermore, the width in the X axis direction of the fourth cooling flow passage f4 and the width in the X axis direction of the seventh cooling flow passage f7 are each a width d4 and equal to each other. Furthermore, the width in the X axis direction of the fifth cooling flow passage f5 and the width in the X axis direction of the sixth cooling flow passage f6 are each a width d5 and equal to each other. In the present embodiment, a width relationship expressed by the following equation (1) holds for the above-described widths d1 to d5.

$$d1<d2<d3<d4<d5 \quad (1)$$

The width relationship expressed by the above equation (1) is set to the widths d1 to d5 in the X axis direction of the cooling flow passages f1 to f10 for following reasons. In a case where the widths d1 to d5 in the X axis direction of the cooling flow passages f1 to f10 satisfy the relationship expressed by the above equation (1), the following equation (2) holds for the cross-sectional area relationship between cross-sectional areas which are parallel to an X-Y plane of each of the cooling flow passages f1 to f10 (also referred to simply as "cross-sectional areas").

$$S1, S10<S2, S9<S3, S8<S4, S7<S5, S6 \quad (2)$$

In the above equation (2), Sn (n is an integer of 1 to 10) represents a cross-sectional area of an nth cooling flow passage fn. That is, the cross-sectional areas of the fifth cooling flow passage f5 and the sixth cooling flow passage f6 located at the center part along the X axis direction among the respective cooling flow passages f1 to f10 are the largest, and the cross-sectional areas located closer to the end part are smaller. In this regard, the fifth cooling flow passage f5 and the sixth cooling flow passage f6 located at the center part along the X axis direction among the respective cooling flow passages f1 to f10 are arranged at positions corresponding to positions close to the center position in each battery row of the battery row group 500 illustrated in FIG. 1 compared to the other cooling flow passages. In a use state, the temperature is higher at the position closer to the center position in each battery row than at a position more distant from the center position in the battery row, in other words, at an end part position, due to heat radiation from each battery. Consequently, by setting the width relationship expressed by the above equation (1) to the widths d1 to d5 in the X axis direction of the cooling flow passages f1 to f10, it is possible to provide cooling flow passages of larger cross-sectional areas to meet positions of higher temperatures, so that it is possible to further cool the battery Bt at a position at which the temperature becomes higher. On the other hand, the temperature is lower at a position more distant from the center position in each battery row than at a position closer to the center position. Consequently, by setting the width relationship expressed by the above equation (1) to the widths d1 to d5 in the X axis direction of the cooling flow passages f1 to f10, it is possible to provide cooling flow passages of smaller cross-sectional areas to meet positions of lower temperatures, so that it is possible to prevent the battery Bt from being excessively cooled, and supply a more cooling medium to a position at which the temperature becomes higher. Consequently, the width relationship expressed by the above equation (1) are set to the widths d1 to d5 in the X axis direction of the cooling flow passages f1 to f10 to further increase a cross-sectional area of a cooling flow passage meeting the battery Bt whose temperature becomes higher in a use state, and a heat quantity received from the cooling flow passage at the bottom part of this battery Bt is increased to improve cooling performance, so that a temperature difference between the batteries Bt is suppressed, and degradation of the entire battery pack 10 is suppressed.

A battery at a position closer to the center position in each battery row corresponds to a "first battery" according to the present disclosure, and a battery at a more distant position corresponds to a "second battery" according to the present disclosure.

The inflow part 191 illustrated in FIGS. 1 and 3 continues to the common inflow passage 112a, and supplies the cooling medium to the common inflow passage 112a. The outflow part 192 continues to the common exhaust passage 112b, and supplies the cooling medium exhausted from the common exhaust passage 112b to the exterior of the main body part 111.

The flow passage forming member 110 is formed by a material having a lower thermal conductivity than that of a heat transfer layer 310 of the heater-equipped heat transfer layer 300. Consequently, it is possible to prevent the heat of the cooling medium in the flow passage 112 from being exchanged with the heat different from heat of the battery Bt, such as the heat of the atmospheric air in an external space of the flow passage forming member 110, and absorb more of the heat from the battery Bt.

The sealing member 200 illustrated in FIG. 1 is pressed fit in the seal groove 114, and suppresses leakage of the cooling medium from the flow passage 112. The sealing member 200 is formed by, for example, an elastomer such as butyl rubber.

Figure 6:
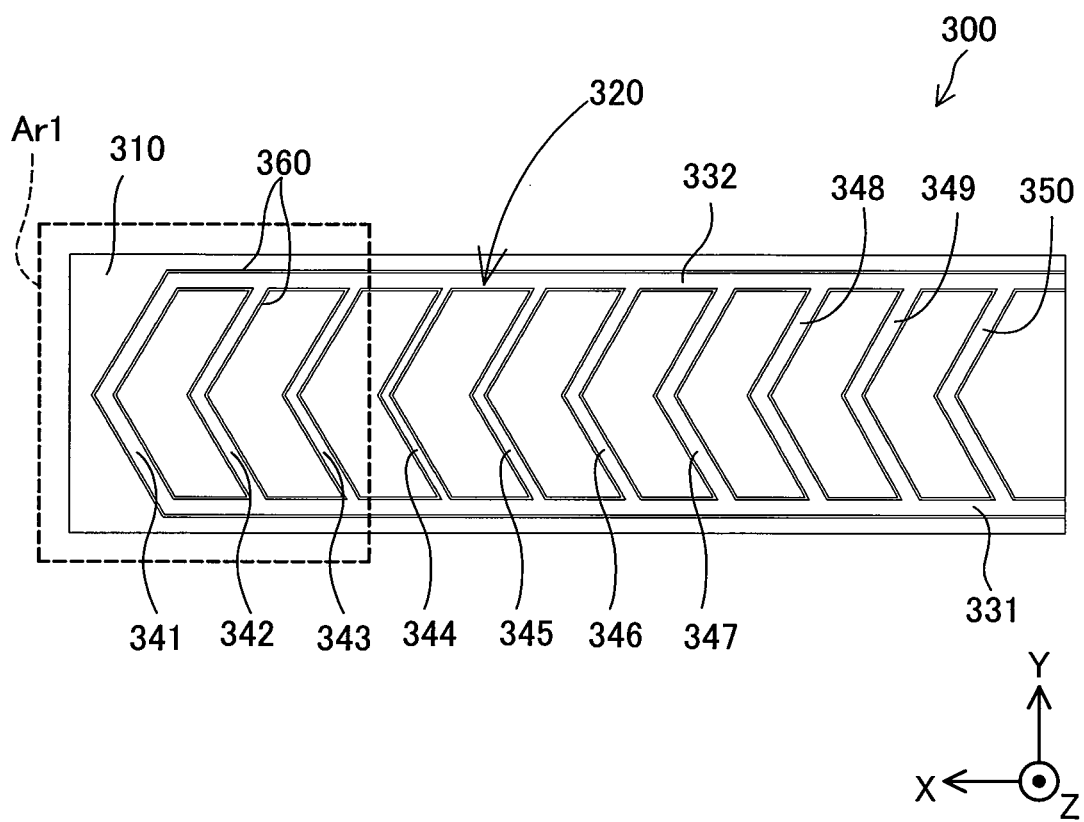
FIG. 6 is a plan view illustrating a detailed configuration of a heater-equipped heat transfer layer.
Figure 7:
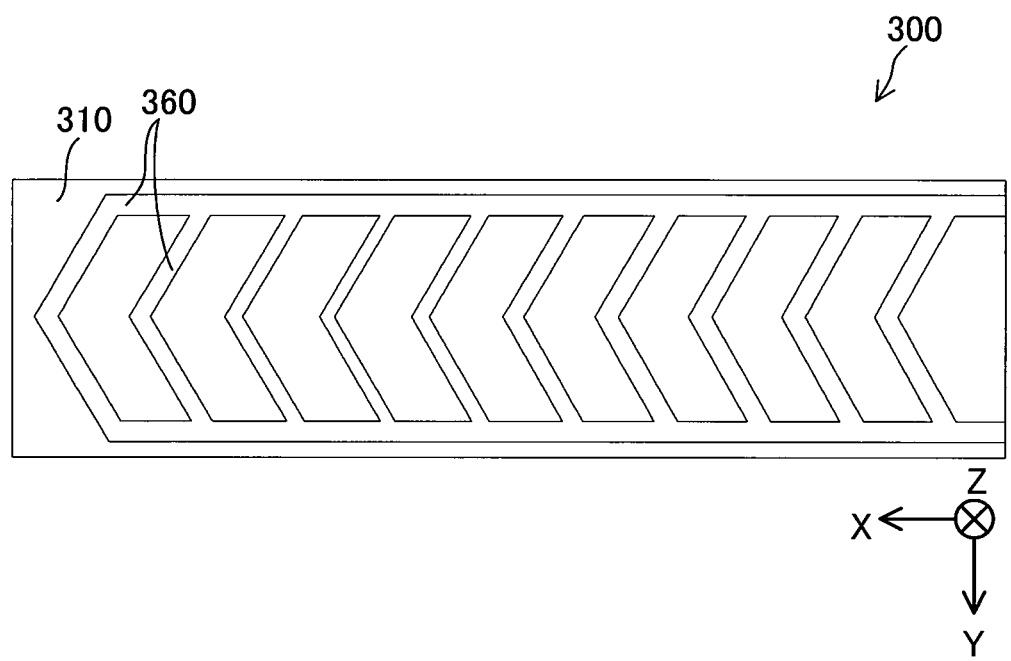
FIG. 7 is a bottom view illustrating a detailed configuration of the heater-equipped heat transfer layer.

FIG. 6 is a plan view illustrating a detailed configuration of the heater-equipped heat transfer layer 300. FIG. 7 is a bottom view illustrating the detailed configuration of the heater-equipped heat transfer layer 300. The heater-equipped heat transfer layer 300 has a function of transferring heat of the battery Bt to the cooling medium in the flow passage 112 to cool, and a function of heating the battery row group 500. As illustrated in FIGS. 6 and 7, the heater-equipped heat transfer layer 300 includes the heat transfer layer 310, a heater 320 and an insulation member 360.

The heat transfer layer 310 is formed by a thin plate member formed by a material having a good thermal conductivity. In the present embodiment, the heat transfer layer 310 is formed by aluminum. In this regard, instead of aluminum, the heat transfer layer 310 may be formed by a material of an arbitrary type, such as copper or silver having a higher thermal conductivity than that of the insulation layer 400.

The heater 320 heats the battery row group 500 at the bottom part of each battery Bt. In the present embodiment, the heater 320 is configured as heating wires whose thicknesses are not uniform. A thickness variation will be described later. As illustrated in FIG. 6, the heater 320 includes an inlet heating part 331, an outlet heating part 332, and 10 flow passage heating parts 341 to 350 in total.

The inlet heating part 331 is arranged at a position meeting the common inflow passage 112a, and heats the common inflow passage 112a. The outlet heating part 332 is arranged at a position meeting the common exhaust passage 112b, and heats the common exhaust passage 112b, The first flow passage heating part 341 is arranged at a position meeting the first cooling flow passage f1, and heats the first cooling flow passage f1. Similarly, the second flow passage heating part 342 is arranged at a position meeting the second cooling flow passage f2, and heats the second cooling flow passage f2. The third flow passage heating part 343 is arranged at a position meeting the third cooling flow passage f3, and heats the third cooling flow passage f3. The fourth flow passage heating part 344 is arranged at a position meeting the fourth cooling flow passage f4, and heats the fourth cooling flow passage f4. The fifth flow passage heating part 345 is arranged at a position meeting the fifth cooling flow passage f5, and heats the fifth cooling flow passage f5. The sixth flow passage heating part 346 is arranged at a position meeting the sixth cooling flow passage f6, and heats the sixth cooling flow passage f6. The seventh flow passage heating part 347 is arranged at a position meeting the seventh cooling flow passage f7, and heats the seventh cooling flow passage f7. The eighth flow passage heating part 348 is arranged at a position meeting the eighth cooling flow passage f8, and heats the eighth cooling flow passage f8. The ninth flow passage heating part 349 is arranged at a position meeting the ninth cooling flow passage f9, and heats the ninth cooling flow passage f9. The 10th flow passage heating part 350 is arranged at a position meeting the 10th cooling flow passage f10, and heats the 10th cooling flow passage f10.

Figure 8:
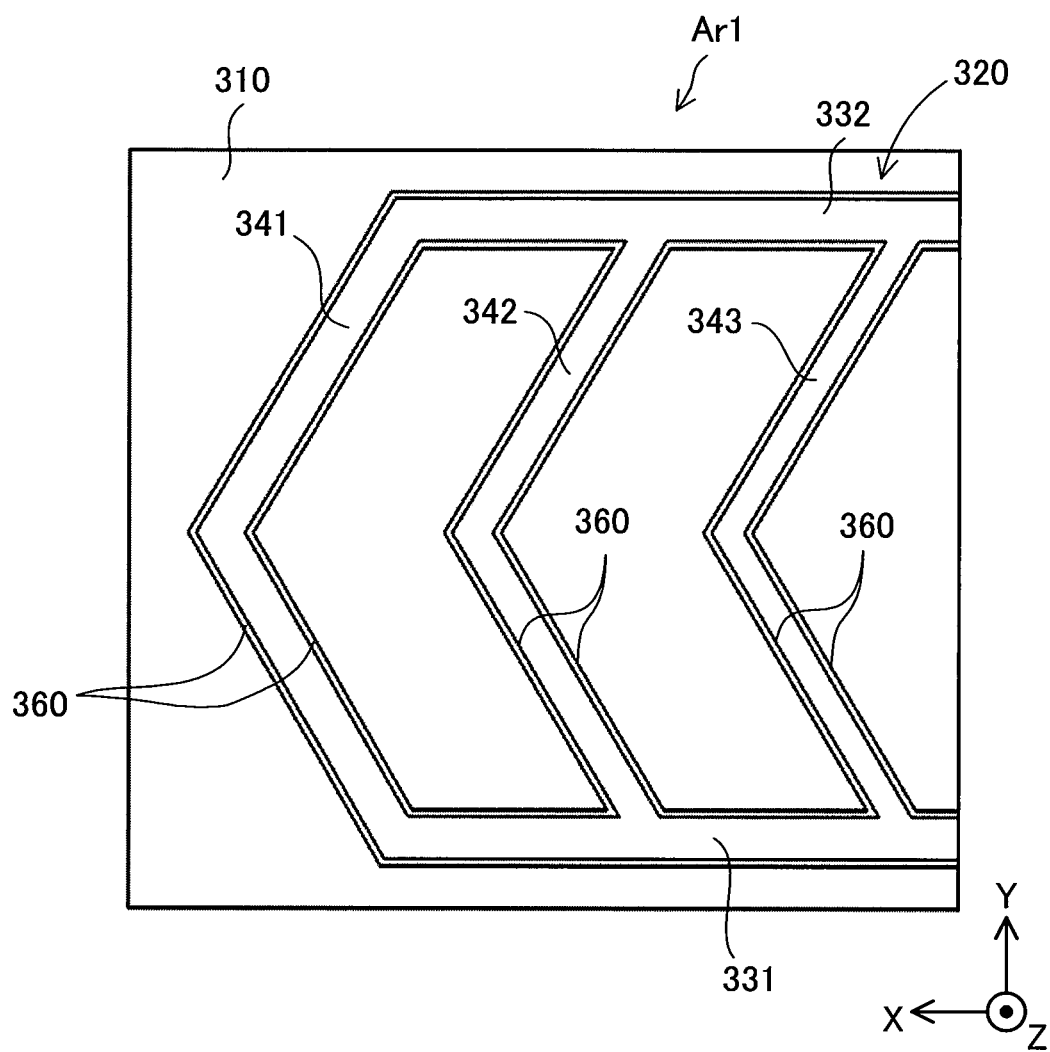
FIG. 8 is an explanatory view illustrating an enlarged partial area illustrated in FIG. 6.

FIG. 8 is an explanatory view illustrating an enlarged partial area Ar1 illustrated in FIG. 6. As illustrated in FIG. 8, the insulation member 360 is arranged to surround an outer rim (side surface) of the heater 320 when the heater-equipped heat transfer layer 300 is seen from the −Z direction. Consequently, it is possible to electrically conduct the heater 320 and the heat transfer layer 310. Furthermore, as illustrated in FIG. 7, the insulation member 360 is arranged to cover the entire heater 320 when the heater-equipped heat transfer layer 300 is seen from the direction. Consequently, it is possible to prevent the heater 320 from directly contacting the cooling medium in the flow passage 112. According to the present embodiment, the insulation member 360 is formed by a resin.

Hereinafter, a cross-sectional area relationship between the cross-sectional areas of the 10 flow passage heating parts 341 to 350 (heating wires) will be described. In the present embodiment, the cross-sectional area relationship expressed by the following equation (3) holds for cross-sectional areas s1 to s10 of the flow passage heating parts 341 to 350.

$$s4<s3,\ s5<s2,\ s6<s1,\ s7\ \text{to}\ s10 \tag{3}$$

Figure 9:
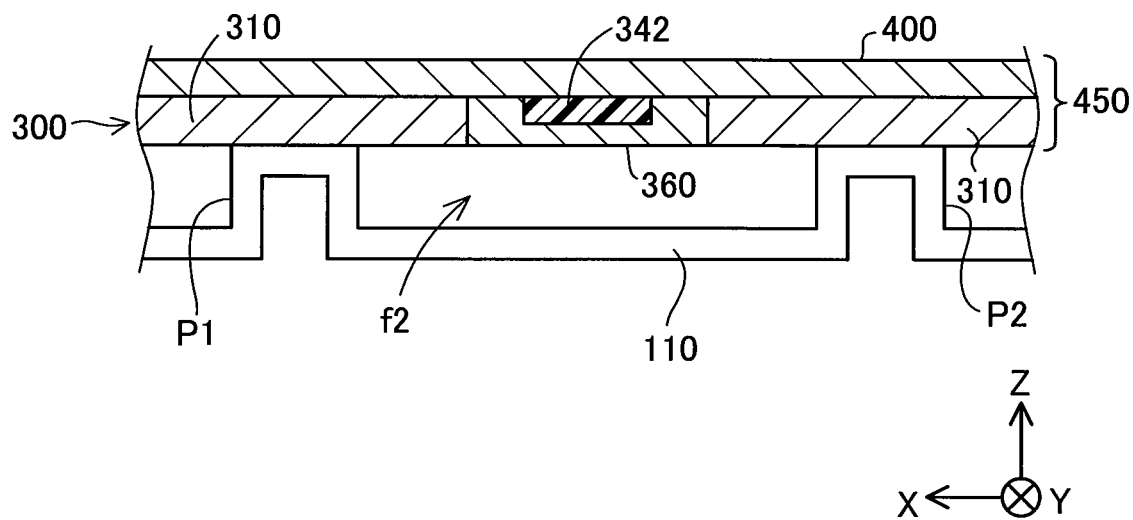
FIG. 9 is a cross-sectional view schematically illustrating a cross-sectional configuration of an insulation layer, the heater-equipped heat transfer layer and the flow passage forming member.

The cross-sectional area s1 indicates the cross-sectional area of the first flow passage heating part 341. Furthermore, the cross-sectional area s2 indicates the cross-sectional area of the second flow passage heating part 342. The cross-sectional area s3 indicates the cross-sectional area of the third flow passage heating part 343. The cross-sectional area s4 indicates the cross-sectional area of the fourth flow passage heating part 344. The cross-sectional area s5 indicates the cross-sectional area of the fifth flow passage heating part 345, The cross-sectional area s6 indicates the cross-sectional area of the sixth flow passage heating part 346. The cross-sectional area s7 indicates the cross-sectional area of the seventh flow passage heating part 347. The cross-sectional area s8 indicates the cross-sectional area of the eighth flow passage heating part 348. The cross-sectional area s9 indicates the cross-sectional area of the ninth flow passage heating part 349. The cross-sectional area s10 indicates the cross-sectional area of the 10th flow passage heating part 350. By employing this configuration, it is possible to make the cross-sectional areas of the first flow passage heating part 341 and the 10th flow passage heating part 350 meeting the batteries Bt arranged at positions more distant from the center position in each battery row of the battery row group 500 illustrated in FIG. 1 such as the batteries Bt arranged at the X direction end part larger than the cross-sectional areas of the fourth flow passage heating part 344, the fifth flow passage heating part 345 and the sixth flow passage heating part 346 meeting the batteries Bt arranged at positions closer to the center position, so that it is possible to add more heat to the batteries Bt at the X direction end part. In addition, temperatures of the batteries Bt arranged at positions more distant from the center position in each battery row of the battery row group 500 tend to become lower than those of the batteries Bt arranged at closer positions. Consequently, the above configuration makes it possible to suppress a decrease of the temperatures of these batteries Bt whose temperatures tend to become lower, and suppress deterioration of the batteries Bt caused by the excessive decrease of the temperatures, FIG. 9 is a cross-sectional view schematically illustrating a cross-sectional configuration of the insulation layer 400, the heater-equipped heat transfer layer 300 and the flow passage forming member 110. The insulation layer 400 is formed by a thin plate member formed by a resin. As illustrated in FIG. 9, the insulation layer 400, the heat transfer layer 310, the insulation member 360 and the second flow passage heating part 342 are interposed between the batteries Bt and the cooling medium flowing in the second cooling flow passage f2 along the Z axis direction. Hence, the insulation layer 400, the heat transfer layer 310, the insulation member 360 and the second flow passage heating part 342 make up an interposed layer 450.

As illustrated in FIG. 9, the second flow passage heating part 342 has the −Z direction and the Z axis direction covered by the insulation member 360 made of the resin, and has the +Z direction covered by the insulation layer 400 made of the resin. Consequently, electrical conduction from the second flow passage heating part 342 to the batteries Bt or the cooling medium is suppressed.

In addition, the unillustrated batteries Bt are arranged in the +Z direction in the insulation layer 400 illustrated in FIG. 9. In this case, an adhesive having a heat transfer property may be arranged between the batteries Bt and the insulation layer 400 to fix the batteries Bt and the insulation layer 400 to each other. Consequently, it is possible to prevent vibration or a load applied to the battery pack 10 from misaligning the components of the battery pack 10. As this adhesive, for example, an epoxy adhesive or a silicone adhesive may be used.

According to the above-described temperature adjustment device 100 according to the first embodiment, the cross-sectional area of the cooling flow passage meeting the battery Bt whose temperature becomes high in a use state among the plurality of batteries Bt is larger than the cross-sectional areas of the cooling flow passage meeting the batteries Bt whose temperatures become lower, so that it is possible to increase a heat quantity received from the cooling flow passage at the bottom part of the battery Bt whose temperature becomes higher, and improve cooling performance. Consequently, it is possible to suppress a temperature difference between the plurality of batteries Bt in the use state, and suppress deterioration of the entire battery pack 10.

Furthermore, the temperature adjustment device 100 includes the heat transfer layer 310 which is sandwiched between the insulation layer 400 and the cooling flow passages f1 to f10, and is formed by a material having a high thermal conductivity than that of the insulation layer 400, so that it is possible to transfer heat of the batteries Bt to the cooling medium in the flow passage 112 in a short time compared to a configuration where a layer having the same thickness as that of the heat transfer layer 310 is formed by the insulation layer 400.

Furthermore, the flow passage forming member 110 is formed by a material having a lower thermal conductivity than that of the heat transfer layer 310, so that it is possible to prevent heat of the cooling medium in the flow passage 112 from being exchanged with heat different from heat of the battery Bt, such as heat of an atmospheric air in an external space of the flow passage forming member 110, and make the cooling medium absorb more of the heat of the battery Bt.

Furthermore, in an arrangement including a battery row in which the plurality of batteries Bt is aligned in a direction parallel to the common inflow passage 112a and the common exhaust passage 112b, it is possible to further cool the battery Bt whose temperature becomes higher in the use state, and it is possible to suppress deterioration of the batteries in the entire battery pack 10.

Furthermore, the flow passage 112 can be formed by two members of the flow passage forming member 110 which includes the groove part, and the interposed layer 450, so that it is possible to form the flow passage in a complicated shape compared to the configuration where the flow passage is formed by one member. Consequently, it is possible to improve a degree of freedom of the shape of the flow passage 112, and easily form the flow passage which is suitable for temperature adjustment. More specifically, it is possible to form the shape of each of the cooling flow passages f1 to f10 as a shape which matches an alignment of the batteries in the battery row group 500, so that it is possible to perform fine temperature control.

Furthermore, the heater 320 is arranged in contact with the flow passage 112 in a state where the heater 320 is covered by the insulation member, so that it is possible to prevent short-circuiting from occurring via the heater 320, and miniaturize the temperature adjustment device 100 compared to a configuration where the heater 320 is arranged apart from the flow passage 112.

Furthermore, a heating quantity for heating the bottom part of the battery Bt whose temperature becomes lower in the use state is larger than a heating quantity for heating the bottom part of the battery Bt whose temperature becomes higher, so that it is possible to suppress temperature variations between the plurality of batteries Bt.

Furthermore, the cross-sectional area of the flow passage heating part (heating wire) meeting the cooling flow passage which faces the bottom part of the battery Bt whose temperature becomes lower in the use state with the insulation layer 400 interposed therebetween is larger than the cross-sectional area of the flow passage heating part (heating wire) meeting the cooling flow passage which faces the bottom part of the battery Bt whose temperature becomes higher with the insulation layer 400 interposed therebetween, so that it is possible to make the heating quantity for the battery Bt whose temperature becomes lower, larger than the heating quantity for the battery Bt whose temperature becomes higher, and suppress temperature variations between the plurality of batteries Bt.

B. Second Embodiment

Figure 10:
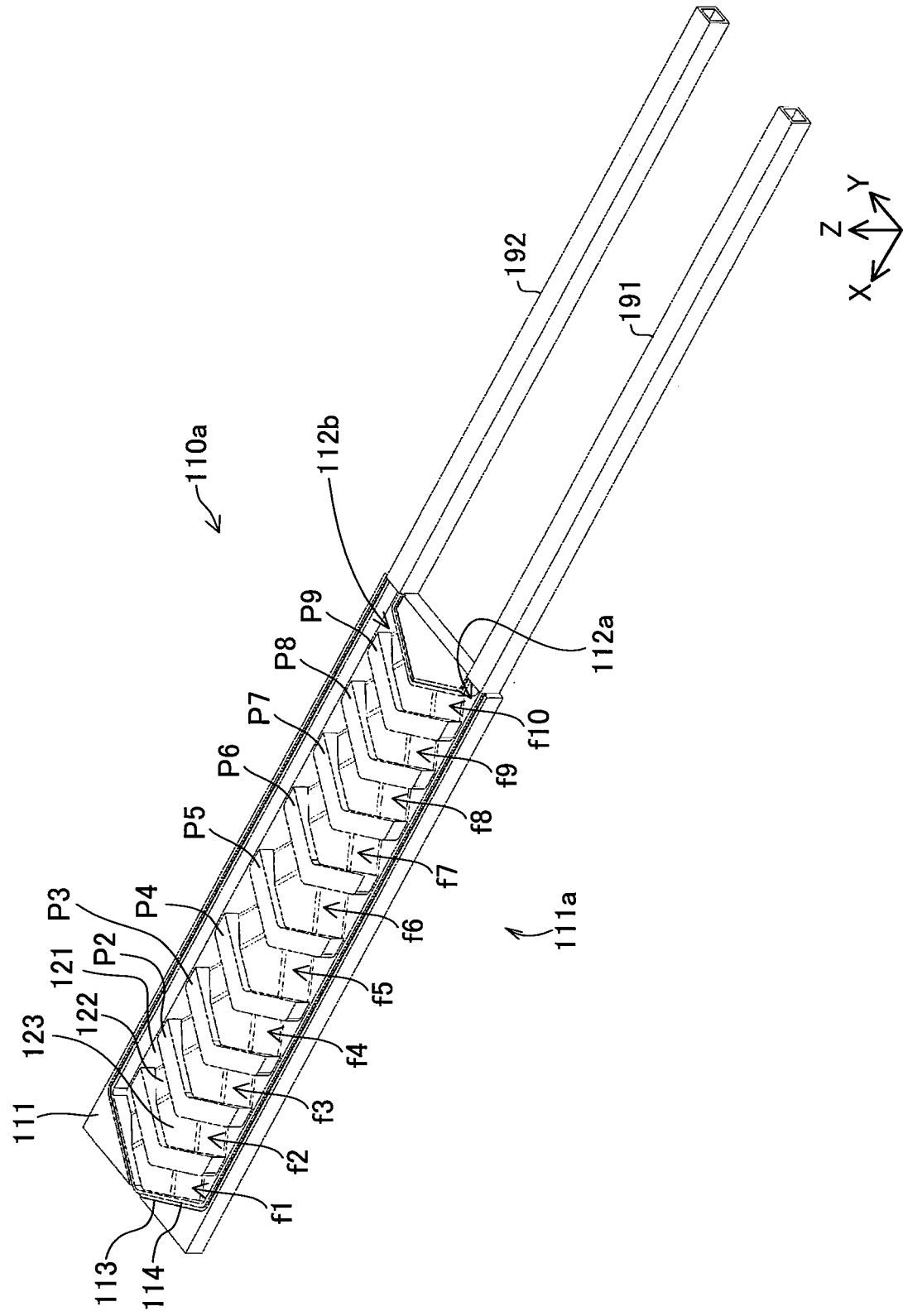
FIG. 10 is a perspective view illustrating a configuration of the flow passage forming member according to a second embodiment.
Figure 11:
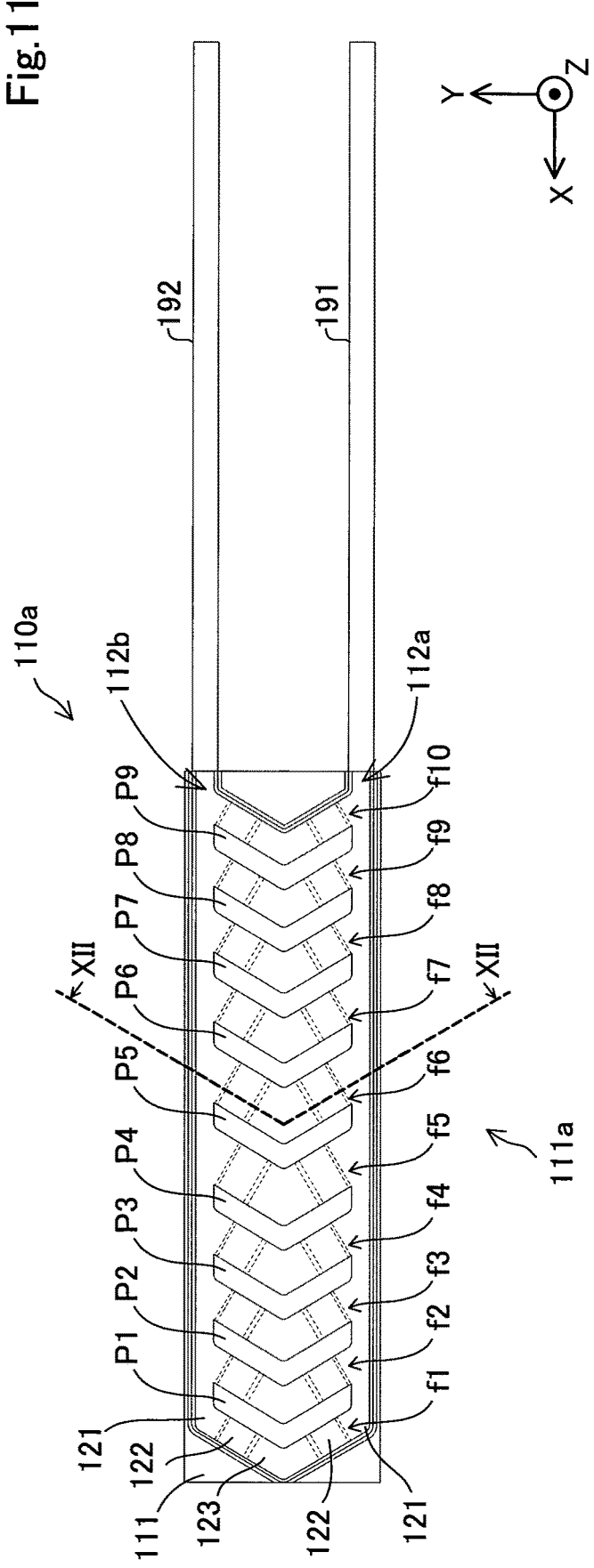
FIG. 11 is a plan view illustrating a detailed configuration of the flow passage forming member.
Figure 12:
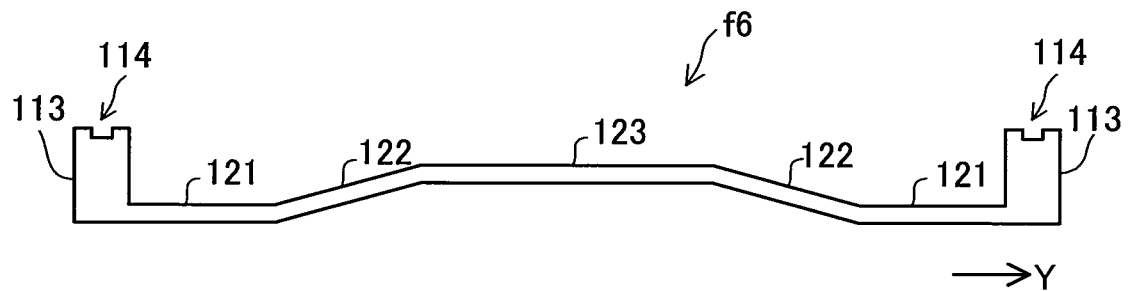
FIG. 12 is a cross-sectional view illustrating the detailed configuration of the flow passage forming member.

FIG. 10 is a perspective view illustrating a configuration of a flow passage forming member 110a according to the second embodiment. FIG. 11 is a plan view illustrating a detailed configuration of the flow passage forming member 110a. FIG. 12 is a cross-sectional view illustrating a detailed configuration of the flow passage forming member 110a. FIG. 12 illustrates a cross section along an XII-XII cross-section illustrated in FIG. 11. The temperature adjustment device 100 according to the second embodiment differs from the temperature adjustment device 100 according to the first embodiment in including the flow passage forming member 110a illustrated in FIG. 10 instead of the flow passage forming member 110. Other components of the temperature adjustment device 100 according to the second embodiment are the same as those of the temperature adjustment device 100 according to the first embodiment, and therefore identical components will be assigned identical reference numerals and detailed description thereof will be omitted.

The flow passage forming member 110a according to the second embodiment illustrated in FIGS. 10 to 12 differs from the flow passage forming member 110 only in including a main body part 111a instead of the main body part 111. A part of the main body part 111 according to the first embodiment corresponding to each of the cooling flow passages f1 to f10 is flat in the entire Y axis direction as illustrated in FIGS. 3 and 5. Contrastingly, the main body part 111a according to the second embodiment is not flat as illustrated in FIGS. 10 and 12. The main body part 111a includes at a bottom part in the -Z direction, a pair of lower flat parts 121, a pair of slope parts 122 and an upper flat part 123. The pair of lower flat parts 121 form the common inflow passage 112a and the common exhaust passage 112b. The pair of slope parts 122 form slopes which continue to the pair of lower flat parts 121 and are located in the +Z direction toward the center position in the Y axis direction in the cooling flow passage. Furthermore, the pair of slope parts 122 sandwich the upper flat part 123. Hence, each slope part 122 continues to the lower flat part 121 at one end in the Y axis direction, and continues to the upper flat part 123 at the other end. According to the present embodiment, a connection part of each slope part 122 and the lower flat part 121 and a connection part of each slope part 122 and the upper flat part 123 are each chamfered and rounded. A structure of these pair of lower flat parts 121, pair of slot parts 122 and upper flat part 123 is formed by, for example, performing a bending process on the main body part 111a.

The main body part 111a has the above-described bent shape, so that the cross-sectional area of each of the cooling flow passages f1 to f10 intersecting a flowing direction of the cooling medium is not fixed. More specifically, cross-sectional areas of the pair of slope parts 122 decrease from the common inflow passage 112a and the common exhaust passage 112b (the pair of lower flat parts 121) to the center position in the Y axis direction of the cooling flow passage. Furthermore, the cross-sectional areas of the pair of slope parts 122 become minimum at a part corresponding to the upper flat part 123. In this regard, when the cooling medium of the same amount passes, a flow rate of the cooling medium becomes higher as the cross-sectional area becomes smaller. Hence, the flow rate of the cooling medium increases toward the center position in the Y axis direction in each of the cooling flow passages f1 to f10, and becomes maximum at a part corresponding to the upper flat part 123, When the flow rate of the cooling medium is higher, cooling performance is higher. Furthermore, according to a configuration where three battery rows are aligned in the Y axis direction as illustrated in FIG. 1, temperatures of the batteries Bt at positions closer to the center position (center battery row) in the Y axis direction become higher. Consequently, by employing the above configuration, it is possible to further enhance the cooling performance for the batteries Bt whose temperatures are higher, and suppress deterioration of the entire battery pack 10.

Parts corresponding to the pair of slope parts 122 in each of the cooling flow passages f1 to f10 correspond to "gradually decreasing in cross-sectional area parts" according to the present disclosure.

The above-described temperature adjustment device 100 according to the second embodiment provides an effect similar to that of the temperature adjustment device 100 according to the first embodiment. In addition, each of the cooling flow passages f1 to f10 includes the gradually decreasing in cross-sectional area part at which the cross-sectional area of each of the cooling flow passages f1 to f10 intersecting the flowing direction of the cooling medium gradually decreases from the common inflow passage 112a and the common exhaust passage 112b to the center position along the cooling flow passages f1 to f10, so that it is possible to gradually increase the flow rate of the cooling medium toward the center position, and improve the cooling performance. In this regard, the plurality of batteries Bt is symmetrically arranged along each of the cooling flow passages f1 to f10 around the center position along the cooling flow passages, so that the temperatures of the batteries Bt in the use state may become higher toward the center position. Consequently, it is possible to further increase the flow rate of the cooling medium at a part at which a battery temperature may become higher, and improve the cooling performance, so that it is possible to further suppress deterioration of the batteries Bt.

Furthermore, the connection part of each slope part 122 and the lower flat part 121 and the connection part of each slope part 122 and the upper flat part 123 are each chamfered and rounded, so that it is possible to reduce a flow passage resistance at each connection part.

C. Third Embodiment

C1. Device Configuration

Figure 13:
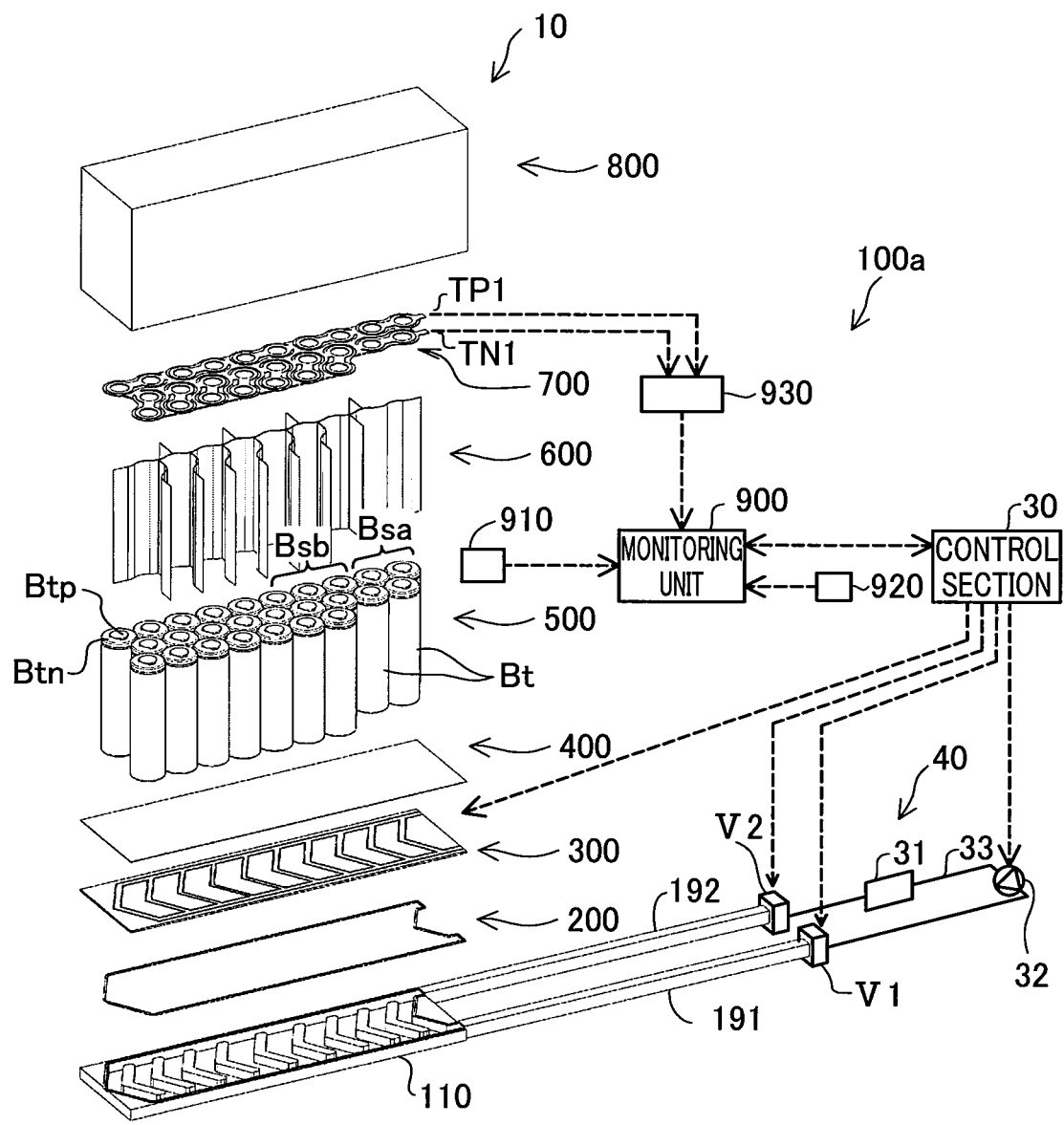
FIG. 13 is an exploded perspective view illustrating the disassembled temperature adjustment device according to the third embodiment and battery pack.
Figure 14:
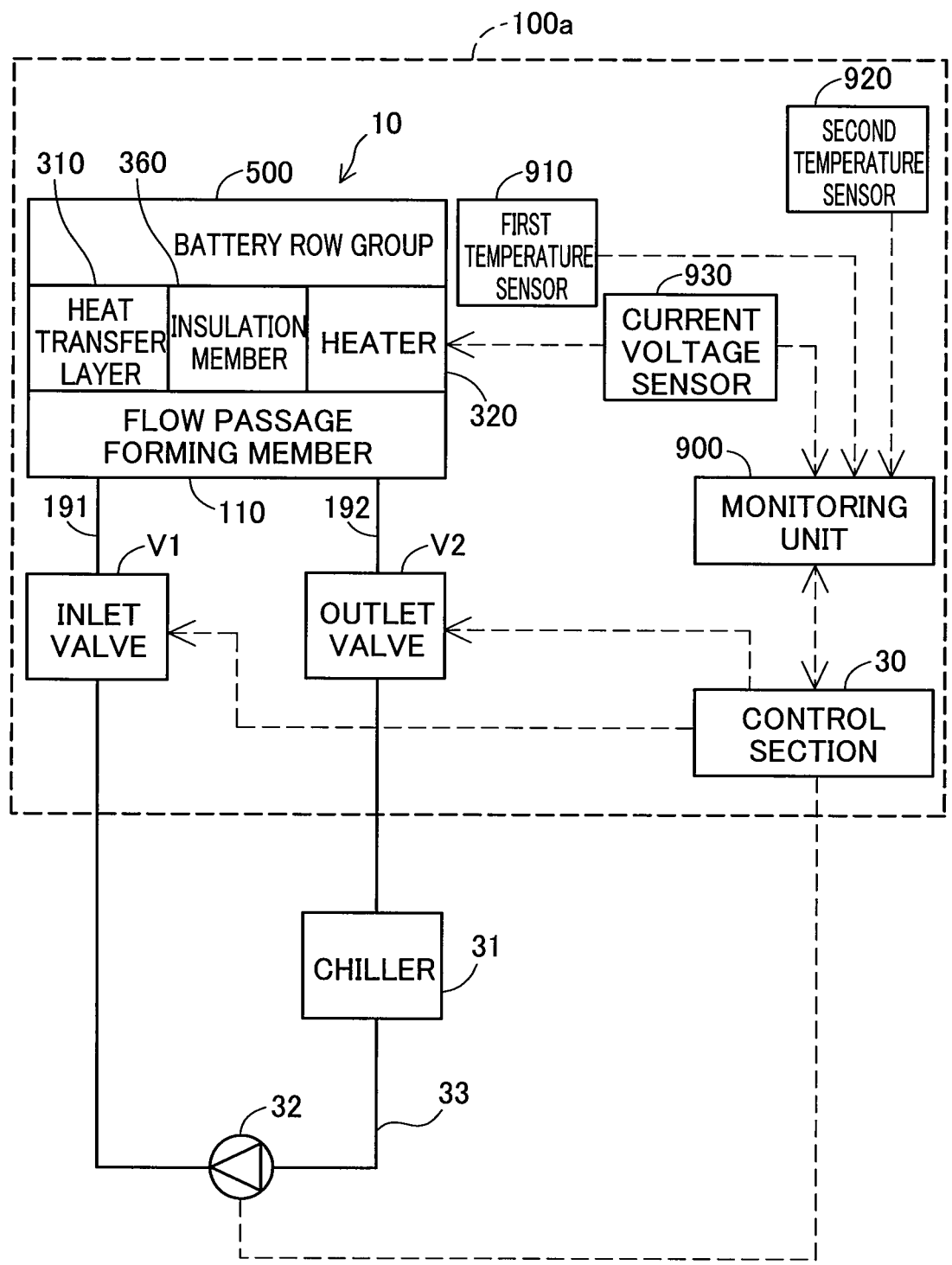
FIG. 14 is a block diagram illustrating a configuration of the temperature adjustment device according to the third embodiment.

FIG. 13 is an exploded perspective view illustrating a disassembled temperature adjustment device 100a according to the third embodiment, and battery pack 10. FIG. 14 is a block diagram illustrating a configuration of the temperature adjustment device 100a according to the third embodiment. The temperature adjustment device 100a according to the third embodiment differs from the temperature adjustment device 100 according to the first embodiment in additionally including a control section 30, a first temperature sensor 910, a second temperature sensor 920, a current voltage sensor 930, a monitoring unit 900, an inlet valve V1, and an outlet valve V2. Other components of the temperature adjustment device 100a according to the third embodiment are the same as those of the temperature adjustment device 100 according to the first embodiment, and therefore identical components will be assigned identical reference numerals and detailed description thereof will be omitted.

The control section 30 controls valve opening degrees of the inlet valve V1 and the outlet valve V2. The control section 30 is electrically connected with the two valves V1 and V2, and is electrically connected with the monitoring unit 900 and a pump 32 described later.

The first temperature sensor 910 is arranged in the vicinity of the battery row group 500, and detects the temperature of the battery row group 500. "The temperature of the battery row group 500" is a temperature which represents the temperature of the battery row group 500. According to, for example, a configuration where the first temperature sensor 910 is arranged in contact with, for example, the side surface of the one certain battery Bt of the battery row group 500, the temperature of the side surface of this battery corresponds to "the temperature of the battery row group 500". Furthermore, according to, for example, a configuration where the first temperature sensor 910 is arranged in the vicinity of the battery located at a substantially center position of the battery row group 500, the temperature in the vicinity of this battery corresponds to "the temperature of the battery row group 500". In addition, "the temperature of the battery row group 500" is also referred to simply as a "battery temperature". The first temperature sensor 910 is electrically connected with the monitoring unit 900. The second temperature sensor 920 detects an atmospheric temperature in the installation environment of the temperature adjustment device 100a. The second temperature sensor 920 is electrically connected with the monitoring unit 900.

The current voltage sensor 930 measures an output voltage of the battery row group 500 (an inter-terminal voltage between the total positive electrode TP1 and the total negative electrode TN1), and an output current value. The current voltage sensor 930 is electrically connected with the monitoring unit 900.

The monitoring unit 900 obtains detection values of each of the sensors 910, 920 and 930, and notifies the control section 30 of the detection values. The control section 30 executes temperature adjustment processing described later by using the detected values notified from the monitoring unit 900. The control section 30 is electrically connected with the monitoring unit 900, and is electrically connected to each of the two valves V1 and V2, the pump 32 and the heater 320. The control section 30 is configured as, for example, a computer (e.g., microcomputer) which includes a Central Processing Unit (CPU) and a memory.

The inlet valve V1 is provided to the inflow part 191, and adjusts the flow rate of the cooling medium which flows in the flow passage 112 through the inflow part 191. The outlet valve V2 is provided to the outflow part 192, and adjusts the flow rate of the cooling medium which is exhausted from the flow passage 112 to the exterior (a circulation flow passage 33) through the outflow part 192. According to the present embodiment, the two valves V1 and V2 are each configured as a solenoid valve, and the electrically connected control section 30 controls the valve opening degrees of the valves V1 and V2.

According to the present embodiment, the inflow part 191 and the outflow part 192 are connected to a cooling medium circulation part 40. The cooling medium circulation part 40 includes a circulation flow passage 33, a chiller 31 which is provided to the circulation flow passage 33, and the pump 32. The circulation flow passage 33 is a cooling medium flow passage whose one end is connected to the inlet valve V1, and whose other end is connected to the outlet valve V2. The chiller 31 cools the cooling medium which flows in the circulation flow passage 33. The chiller 31 may use a cooling device of, for example, a system which cools the cooling medium by heat exchange with external air or a system which cools the cooling medium by heat exchange with a cooling medium (cooling water) different from the cooling medium. The pump 32 adjusts the flow rate of the cooling medium in the circulation flow passage 33. The pump 32 is electrically connected to the control section 30, and is controlled by the control section 30.

The temperature adjustment device 100a according to the third embodiment employing the above configuration executes the temperature adjustment processing described below, so that it is possible to prevent the temperature of the battery row group 500 from becoming excessively high or low.

C2. Temperature Adjustment Processing

Figure 15:
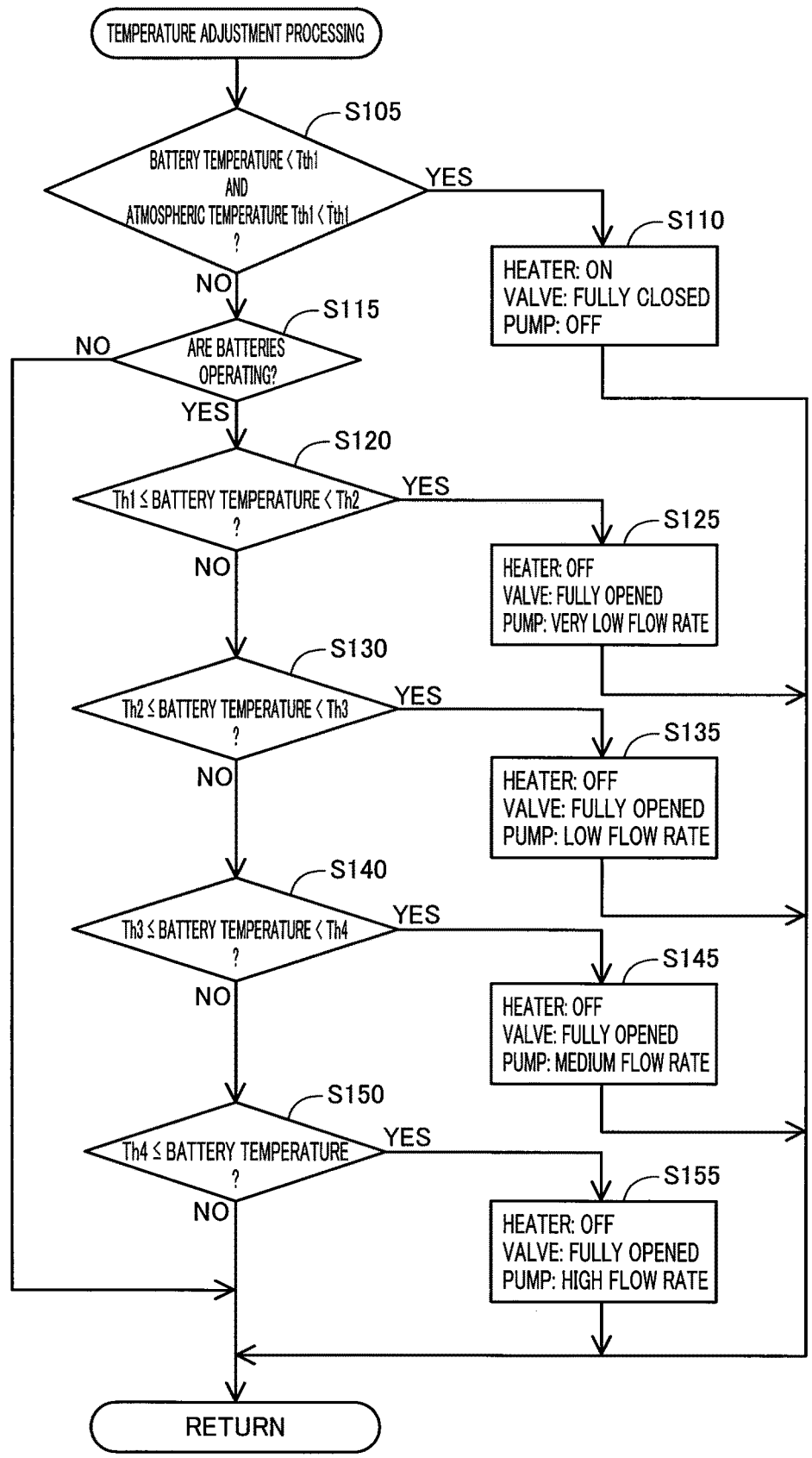
FIG. 15 is a flowchart illustrating a procedure of temperature adjustment processing according to the third embodiment.

FIG. 15 is a flowchart illustrating a procedure of temperature adjustment processing according to the third embodiment. The temperature adjustment processing illustrated in FIG. 15 is executed when the control section 30 (microcomputer) is powered on.

The control section 30 determines whether or not the battery temperature detected by the first temperature sensor 910 is lower than a predetermined first threshold temperature Tth1, and the atmospheric temperature detected by the second temperature sensor 920 is lower than the first threshold temperature Tth1 (step S105). In the present embodiment, the first threshold temperature Tth1 is set as a temperature before the temperature of the battery row group 500 becomes excessively low (e.g., −40° C.) when the temperature lowers. For example, the first threshold temperature Tth1 is set to an arbitrary temperature within a temperature range of 0° C. to 5° C. In addition, the first threshold temperature Tth1 is not limited to this temperature range, and may be set to an arbitrary temperature before the temperature of the first threshold temperature Tth1 becomes excessively low when the temperature lowers.

When the battery temperature is lower than the first threshold temperature Tth1 and the atmospheric temperature is lower than the first threshold temperature Tth1 (step S105: YES), the control section 30 turns on the heater 320, fully closes the two valves V1 and V2, and turns off the pump 32 (step S110). When the battery temperature is lower than the first threshold temperature Tth1 and the atmospheric temperature is lower than the first threshold temperature Tth1, there is a concern that the temperature of the battery row group 500 will continue decreasing, and that the battery temperature will become excessively low. Hence, in this case, the heater 320 is turned on to heat the battery row group 500. Furthermore, in this case, the two valves V1 and V2 are fully closed and the pump 32 is turned off, so that the cooling medium does not flow in the flow passage 112 and the circulation flow passage 33. Consequently, it is possible to prevent heat of the battery row group 500 from being absorbed by the cooling medium, and improve a heating effect of the heater 320.

When the battery temperature is not lower than the first threshold temperature Tth1 and the atmospheric temperature is not lower than the first threshold temperature Tth1, that is, at least one of the battery temperature and the atmospheric temperature is equal to or more than the first threshold temperature Tth1 (step S105: NO), the control section 30 determines whether or not the batteries are operating (step S115). That "the batteries are operating" means a state where the battery pack 10 is supplying electricity. The current voltage sensor 930 can determine whether or not the battery pack 10 is in this state based on a detection value. When it is determined that the batteries are not operating (step S115: NO), processing returns to step S105.

Contrastingly, when it is determined that the batteries are operating (step S115: YES), the control section 30 determines whether or not the battery temperature is equal to or more than the first threshold temperature Tth1 and is lower than a predetermined second threshold temperature Tth2 (step S120). The second threshold temperature Tth2 is a temperature which is higher than the first threshold temperature Tth1. For example, the second threshold temperature Tth2 is set to an arbitrary temperature within a temperature range of 10° C. to 20° C. In addition, the second threshold temperature Tth2 is not limited to this temperature range, and may be set to an arbitrary temperature which is higher than the first threshold temperature Tth1 and is lower than an excessively high temperature (e.g., 100° C.).

When the battery temperature is equal to or more than the first threshold temperature Tth1 and is lower than the second threshold temperature Tth2 (step S120: YES), the control section 30 turns off the heater 320, fully opens the two valves V1 and V2, and controls the pump 32 such that the flow rate is very low (step S125). When the battery temperature is equal to or more than the first threshold temperature Tth1 and is lower than the second threshold temperature Tth2, demand for heating the battery row group 500 is low. Furthermore, in this case, while it is not necessary to significantly cool the battery row group 500, it is necessary to cool the battery row group 500 to maintain a current battery temperature. Hence, in this case, the two valves V1 and V2 are fully opened, and the pump 32 is controlled such that the flow rate is very low.

When it is determined that the battery temperature is equal to or more than the first threshold temperature Tth1 and is not lower than the second threshold temperature Tth2 (step S120: NO), the control section 30 determines whether or not the battery temperature is equal to or more than the second threshold temperature Tth2 and is lower than a predetermined third threshold temperature Tth3 (step S130). The third threshold temperature Tth3 is a temperature which is higher than the second threshold temperature Tth2. For example, the third threshold temperature Tth3 is set to an arbitrary temperature within a temperature range of 20° C. to 40° C. In addition, the third threshold temperature Tth3 is not limited to this temperature range, and may be set to an arbitrary temperature which is higher than the second threshold temperature Tth2 and is lower than an excessively high temperature (e.g., 100° C.).

When it is determined that the battery temperature is equal to or more than the second threshold temperature Tth2 and is lower than the third threshold temperature Tth3 (step S130: YES), the control section 30 turns off the heater 320, fully opens the two valves V1 and V2, and controls the pump 32 such that the flow rate is "low" (step S135). When the battery temperature is equal to or more than the second threshold temperature Tth2 and is lower than the third threshold temperature Tth3, demand for heating the battery row group 500 is low. Furthermore, in this case, while it is not necessary to significantly cool the battery row group 500, it is necessary to cool the battery row group 500 to maintain or slightly cool a current battery temperature. Hence, in this case, the two valves V1 and V2 are fully opened, and the pump 32 is controlled such that the flow rate is "low". In this regard, the valve opening degrees of the valves V1 and V2 in this case are larger than the valve opening degrees in step S125.

When it is determined that the battery temperature is equal to or more than the second threshold temperature Tth2 and is not lower than the third threshold temperature Tth3 (step S130: NO), the control section 30 determines whether or not the battery temperature is equal to or more than the third threshold temperature Tth3 and is lower than a predetermined fourth threshold temperature Tth4 (step S140). The fourth threshold temperature Tth4 is a temperature which is higher than the third threshold temperature Tth3. For example, the fourth threshold temperature Tth4 is set to an arbitrary temperature within a temperature range of 40° C. to 60° C. In addition, the fourth threshold temperature Tth4 is not limited to this temperature range, and may be set to an arbitrary temperature which is higher than the third threshold temperature Tth3 and is lower than an excessively high temperature (e.g., 100° C.).

When it is determined that the battery temperature is equal to or more than the third threshold temperature Tth3 and is lower than the fourth threshold temperature Tth4 (step S140: YES), the control section 30 turns off the heater 320, fully opens the two valves V1 and V2, and controls the pump 32 such that the flow rate is "medium" (step S145). When the battery temperature is equal to or more than the third threshold temperature Tth3 and is lower than the fourth threshold temperature Tth4, demand for heating the battery row group 500 is low. Furthermore, it is necessary to cool the battery row group 500 to a medium degree in this case. Hence, in this case, the two valves V1 and V2 are fully opened, and the pump 32 is controlled such that the flow rate is "medium". In this regard, the valve opening degrees of the valves V1 and V2 in this case are larger than the valve opening degrees in step S135.

When it is determined that the battery temperature is equal to or more than the third threshold temperature Tth3 and is not lower than the fourth threshold temperature Tth4 (step S140: NO), the control section 30 determines whether or not the battery temperature is equal to or more than the fourth threshold temperature Tth4 (step S150).

When it is determined that the battery temperature is equal to or more than the fourth threshold temperature Tth4 (step S150: YES), the control section 30 turns off the heater 320, fully opens the two valves V1 and V2, and controls the pump 32 such that the flow rate is "high" (step S155). When the battery temperature is equal to or more than the fourth threshold temperature Tth4, demand for heating, the battery row group 500 is low. Furthermore, it is necessary to significantly cool the battery row group 500 in this case. Hence, in this case, the two valves V1 and V2 are fully opened, and the pump 32 is controlled such that the flow rate is "high". In this regard, the valve opening degrees of the valves V1 and V2 in this case are larger than the valve opening degrees in step S145. When it is determined that the battery temperature is not equal to or more than the fourth threshold temperature Tth4 (step S150: NO), processing returns to step S105.

The above-described temperature adjustment device 100a according to the third embodiment provides an effect similar to that of the temperature adjustment device 100 according to the first embodiment. In addition, the valve opening degrees of the inlet valve V1 and the outlet valve V2 in a state where the heater 320 is operating (step S110) are smaller than valve opening degrees in a state where the heater is not operating (steps S125, 135, 145 and 155), so that it is possible to reduce the flow rate of the cooling medium flowing in the flow passage 112 compared to a configuration where the valve opening degrees are larger than valve opening degrees in a state where the heater is not operating. Consequently, it is possible to suppress the cooling medium flowing in the flow passage 112 from absorbing heat from the heater 320, and heat and cool the batteries Bt while suppressing a decrease in heating efficiency.

D. Other Embodiment (D1) In each embodiment, the heat transfer layer 310 may be omitted. According to this configuration, a part corresponding to the heat transfer layer 310 may be formed by a material similar to that of the insulation layer 400 and the insulation member 360.

(D2) Although the flow passage forming members 110 and 110a are formed by a material having lower thermal conductivity than the thermal conductivity of the heat transfer layer 310 in each embodiment, the present disclosure is not limited to this. The flow passage forming members 110 and 110a may be formed by a material having a thermal conductivity equal to or more than the thermal conductivity of the heat transfer layer 310.

(D3) Although the gradually decreasing in cross-sectional area part is configured as the part whose cross-sectional area gradually decreases in the direction from the common inflow passage 112a and the common exhaust passage 112b to the center position along the cooling flow passages f1 to f10 in the second embodiment, the present disclosure is not limited to this. In a case where the battery Bt whose temperature is the highest among the batteries Bt arranged along each of the cooling flow passages f1 to f10 is the battery Bt at a position shifted from the center position, the gradually decreasing in cross-sectional area part may be configured as the part whose cross-sectional area gradually decreases in a direction to the position meeting this battery from the common inflow passage 112a and the common exhaust passage 112b.

(D4) Although the cross-sectional areas of the fifth cooling flow passage f5 and the sixth cooling flow passage f6 located at the center part along the X axis direction among each of the cooling flow passages f1 to f10 is the largest in each embodiment, and the cross-sectional areas of the cooling flow passages located closer to the end parts are smaller, the present disclosure is not limited to this. In a configuration where, for example, there are some heat sources in the vicinity in the +X direction of the battery row group 500, and therefore the temperature becomes the highest at the end part in the +X direction in the battery row group 500 and the temperature becomes gradually lower along the −X direction in the use state, the cross-sectional area (the cross-sectional area parallel to an X-Y plane) of the first cooling flow passage f1 may be the largest, and the cross-sectional areas may gradually decrease along the −X direction. Furthermore, there are five levels of sizes of the cross-sectional areas of the cooling flow passages f1 to f10 in each embodiment, yet there may be two or more arbitrary levels.

(D5) Although the connection part of each slope part 122 and the lower flat part 121 and the connection part of each slope part 122 and the upper flat part 123 are each chamfered, and rounded in the second embodiment, the present disclosure is not limited to this. At least part of these connection parts may not be chamfered and rounded.

(D6) In the second embodiment, the upper flat part 123 may be omitted. That is, there may be adopted a structure of a cross-sectional shape that the pair of slope parts 122 continue and mountain shapes are formed from the lower flat parts 121 in a cross section seen from the X axis direction.

(D7) The flow passage forming member 110 and the interposed layer 450 are respectively configured as separate members in each embodiment, yet may be configured as a single member instead of the separate members. According to this configuration, the sealing member 200 can be omitted.

(D8) Although the two valves V1 and V2 are each configured as a solenoid valve in the third embodiment, the present disclosure is not limited to this. At least one of the two valves V1 and V2 may be a valve which has a valve body formed by bimetal. According to this configuration, an arrangement position of the valve body with respect to a flow passage opening may be set such that a valve opening degree in a state where the heater 320 is operating is smaller than a valve opening degree in a state where the heater 320 is not operating.

(D9) In each embodiment, the cross-sectional area (the cross-sectional area parallel to the X-Y plane, in other words, the cross-sectional area parallel to the insulation layer 400) of each of the cooling flow passages f1 to f10 may be equal to each other. Furthermore, in each embodiment, the cross-sectional area of the flow passage heating part (heating wire) which meets the cooling flow passage facing the bottom part of the battery Bt whose temperature becomes lower in the use state with the insulation layer 400 interposed therebetween is larger than the cross-sectional area of the flow passage heating part (heating wire) which meets the cooling flow passage facing the bottom part of the battery Bt whose temperature becomes higher with the insulation layer 400 interposed therebetween. However, these cross-sectional areas may be equal to each other.

(D10) Although the cross-sectional area of each flow passage heating part (heating wire) is fixed along each of the cooling flow passages f1 to f10 in each embodiment, the present disclosure is not limited to this. The cross-sectional area may gradually increase from the center position along each of the cooling flow passages f1 to f10 toward the common inflow passage 112a and the common exhaust passage 112b. In each of the cooling flow passages f1 to f10, the vicinity of the common inflow passage 112a and the common exhaust passage 112b is a part at which the temperature is the lowest, so that it is possible to more efficiently heat each of the cooling flow passages f1 to f10 by maximizing the cross-sectional area of the flow passage heating part (heating wire) of this part.

(D11) In each embodiment, the insulation layer 400 may be configured as an insulation coated film. According to this configuration, the insulation, layer 400 may be formed by applying cationic coating to the face in the direction of the heater-equipped heat transfer layer 300.

(D12) Although the two valves V1 and V2 are each fully closed in step S110 in the third embodiment, the present disclosure is not limited to this. For example, only the inlet valve V1 may be fully closed, and the outlet valve V2 may have a valve opening degree other than fully closed. Furthermore, the two valves V1 and V2 may be each placed in the opened state. According to this configuration, the valve opening degrees of the two valves V1 and V2 in step S110 may be set to valve opening degrees smaller than the valve opening degrees of the two valves V1 and V2 in steps S125, S135, S145 and S155. This configuration can also make it possible to suppress a flow of the cooling medium in the flow passage 112 and the circulation flow passage 33, and efficiently heat the battery row group 500 by the heater 320.

(D13) In a configuration where the temperature adjustment device 100a is mounted on a vehicle and, for example, the battery pack 10 supplies electricity to a traction motor to drive the vehicle, the temperature adjustment processing may be performed as follows according to a vehicle traveling state and a battery temperature.

(i) Vehicle traveling state: when stopped or when traveling, battery temperature: when temperature is low . . . the heater 320 is turned off, the two valves V1 and V2 are fully closed, and the pump 32 is turned off.

(ii) Vehicle traveling state: when traveling, battery temperature: when temperature is high . . . the heater 320 is turned off, the two valves V1 and V2 are fully opened, and the pump 32 is turned on. In this case, a discharge amount of the pump 32 is adjusted while monitoring the battery temperature to maintain an optimum temperature for suppressing deterioration of the batteries Bt.

(iii) Vehicle traveling state: when stopped, battery temperature: when temperature is high . . . the heater 320 is turned off, the two valves V1 and V2 are fully opened, and the pump 32 is turned off.

In the above (i), the heater: 320 performs heating to adjust the battery temperature to a temperature which suppresses battery deterioration to a minimum. Furthermore, in the above (iii), the heat of the batteries Bt is radiated to the cooling medium in the heat transfer layer 310 and the flow passage 112 without circulating cooling water.

(D14) The temperature adjustment devices 100 and 100a according to each embodiment are merely examples, and can be variously modified. For example, the heater 320 is formed by heating wires in each embodiment, yet may be configured as a plane heater.

The present disclosure is not limited to each of the above embodiments, and can be realized by various configurations without departing from the spirit of the present disclosure. For example, technical features in each embodiment corresponding to technical features in the aspects described in the summary can be replaced or combined as appropriate to solve part or all of the above-described tasks or achieve part or all of the above-described effects. Furthermore, the technical features can be omitted as appropriate unless described as indispensable in the description. For example, the present disclosure may be realized by aspects described below.

(1) One aspect of the present disclosure provides a temperature adjustment device configured to adjust temperatures of a plurality of batteries of a battery pack including the plurality of batteries arranged with axial directions aligned. This temperature adjustment device includes an insulation layer provided in contact with bottom parts of the plurality of batteries, and a flow passage forming member configured to be located on a side opposite to the plurality of batteries with the insulation layer interposed therebetween, and to form a flow passage of a cooling medium. The flow passage includes a plurality of cooling flow passages configured to face bottom surfaces of the plurality of batteries with at least the insulation layer interposed therebetween, and to face the bottom surfaces of one or more respectively different batteries of the plurality of batteries with the insulation layer interposed therebetween, a common inflow passage configured to be connected to the plurality of cooling flow passages and flows the cooling medium in the plurality of cooling flow passages, and a common exhaust passage configured to collect and exhaust the cooling medium exhausted from the plurality of cooling flow passages. A cross-sectional area of the cooling flow passage corresponding to a first battery of the plurality of batteries among cross-sectional areas of the plurality of cooling flow passages is larger than a cross-sectional area of the cooling flow passage corresponding to a second battery whose temperature is lower than the temperature of the first battery in a use state among the plurality of batteries. The cross-sectional areas of the plurality of cooling flow passages have cross sections parallel to a face of the insulation layer in contact with the bottom surfaces.

According to the temperature adjustment device of this aspect, the cross-sectional area of the cooling flow passage meeting the first battery whose temperature is higher than the temperature of the second battery in the use state among the plurality of batteries is larger than the cross-sectional area of the cooling flow passage meeting the second battery, so that it is possible to increase a heat quantity received from the cooling flow passage at the bottom part of the first battery, and improve cooling performance. Consequently, it is possible to suppress a temperature difference between the first battery and the second battery in the use state, and suppress deterioration of the entire battery pack.

(2) The temperature adjustment device according to the above aspect may further include a heat transfer layer configured to be sandwiched between the insulation layer and the cooling flow passage, and to be formed by a material having a higher thermal conductivity than that of the insulation layer.

The temperature adjustment device according to this aspect includes the heat transfer layer which is sandwiched between the insulation layer and the cooling flow passage and is formed by the material having the higher thermal conductivity than that of the insulation layer, so that it is possible to transfer heat of batteries to the cooling medium in the flow passage in a short time compared to a configuration where a layer having the same thickness as that of the heat transfer layer is formed by the insulation layer.

(3) According to the temperature adjustment device according to the above aspect, the flow passage forming member may be formed by a material having a lower thermal conductivity than that of the heat transfer layer.

According to the temperature adjustment device according to this aspect, the flow passage forming member is formed by the material having the lower thermal conductivity than that of the heat transfer layer, it is possible to prevent the heat of the cooling medium in the flow passage from being exchanged with the heat different from heat of the batteries such, as the heat of the atmospheric air in an external space of the flow passage forming member, and make the codling medium absorb more of the heat from the batteries.

(4) According to the temperature adjustment device according to the above aspect, the plurality of batteries may be arranged along each of the cooling flow passages, the plurality of batteries may be symmetrically arranged along each of the cooling flow passages around a center position along each of the cooling flow passages from the common inflow passage to the common exhaust passage, and each of the cooling flow passages may include a gradually decreasing in cross-sectional area part at which the cross-sectional area of each of the cooling flow passages intersecting a flowing direction of the cooling medium gradually decreases in a direction from the common inflow passage and the common exhaust passage to the center position.

According to the temperature adjustment device according to this aspect, each cooling flow passage includes the gradually decreasing in cross-sectional area part at which the cross-sectional area of each cooling flow passage intersecting the flowing direction of the cooling medium gradually decreases in the direction from the common inflow passage and the common exhaust passage to the center position, so that it is possible to gradually increase a flow rate of the cooling medium toward the center position, and improve cooling performance. In this regard, the plurality of batteries is symmetrically arranged along each cooling flow passage around the center position along the cooling flow passages, so that the temperatures of the batteries in the use state may become higher toward the center position. Consequently, it is possible to further increase the flow rate of the cooling medium at a part at which a battery temperature may become higher, and improve the cooling performance, so that it is possible to suppress deterioration of the batteries more.

(5) According to the temperature adjustment device according to the above aspect, the common inflow passage and the common exhaust passage may be linearly provided in parallel to each other, the plurality of batteries include a battery row which may be aligned in a direction parallel to the common inflow passage and the common exhaust passage, and the first battery may be arranged at a position closer to the center position in the battery row than the second battery The temperature adjustment device according to this aspect can further cool the first battery whose temperature becomes higher than that of the second battery in an arrangement which includes the battery row in which the plurality of batteries is aligned in the direction parallel to the common inflow passage and the common exhaust passage, and suppress deterioration of the batteries of the entire battery pack, The present disclosure can be also realized by various modes other than the temperature adjustment device. The present disclosure can be realized as, for example, modes such as a battery structure which is formed by integrating the battery pack and the temperature adjustment device, or a battery pack temperature adjustment method.

What is claimed is:

1. A temperature adjustment device configured to adjust temperatures of a plurality of batteries in a battery pack including the plurality of batteries arranged with axial directions aligned, the temperature adjustment device comprising:

an insulation layer provided in contact with bottom parts of the plurality of batteries; and a flow passage forming member configured to be located on a side opposite to the plurality of batteries with the insulation layer interposed therebetween, and to form a flow passage of cooling medium, wherein the flow passage includes a plurality of cooling flow passages configured to face bottom surfaces of the plurality of batteries with at least the insulation layer interposed therebetween, a common inflow passage configured to be connected to the plurality of cooling flow passages and to flow the cooling medium in the plurality of cooling flow passages, and a common exhaust passage configured to collect and exhaust the cooling medium exhausted from the plurality of cooling flow passages, a cross-sectional area of a cooling flow passage corresponding to a first battery of the plurality of batteries among cross-sectional areas of the plurality of cooling flow passages is larger than a cross-sectional area of a cooling flow passage corresponding to a second battery whose temperature is lower than the temperature of the first battery in a use state among the plurality of batteries, and the cross-sectional areas of the plurality of cooling flow passages have cross sections parallel to a face of the insulation layer in contact with the bottom surfaces.

2. The temperature adjustment device according to claim 1, further comprising a heat transfer layer configured to be sandwiched between the insulation layer and the cooling flow passage, and to be formed by a material having a higher thermal conductivity than a thermal conductivity of the insulation layer.

3. The temperature adjustment device according to claim 2, wherein the flow passage forming member is formed by a material having a lower thermal conductivity than a thermal conductivity of the heat transfer layer.

4. The temperature adjustment device according to claim 1, wherein the plurality of batteries is arranged along each of the cooling flow passages, and the plurality of batteries is symmetrically arranged along each of the cooling flow passages around the center position along each of the cooling flow passages from the common inflow passage to the common exhaust passage, and each of the cooling flow passages includes a gradually decreasing in cross-sectional area part at which a cross-sectional area of each of the cooling flow passages intersecting a flowing direction of the cooling medium gradually decreases in a direction from the common inflow passage and the common exhaust passage to the center position.

5. The temperature adjustment device according to claim 1, wherein the common inflow passage and the common exhaust passage are linearly provided in parallel to each other, the plurality of batteries includes a battery row which are aligned in a direction parallel to the common inflow passage and the common exhaust passage, and the first battery is arranged at a position closer to the center position in the battery row than the second battery.

* * * * *